(12) United States Patent
Hayakawa et al.

(10) Patent No.: US 8,124,247 B2
(45) Date of Patent: Feb. 28, 2012

(54) HIGH-STRENGTH WELDED STEEL PIPE INCLUDING WELD METAL HAVING HIGH COLD-CRACKING RESISTANCE AND METHOD FOR MANUFACTURING THE SAME

(75) Inventors: Naoya Hayakawa, Tokyo (JP); Fumimaru Kawabata, Tokyo (JP); Shuichi Sakaguchi, Tokyo (JP); Mitsuhiro Okatsu, Tokyo (JP); Makoto Ota, Kanagawa (JP); Shigeki Nishiyama, Kanagawa (JP); Kaoru Nagatani, Kanagawa (JP); Keito Ishizaki, Kanagawa (JP)

(73) Assignees: JFE Steel Corporation (JP); Kabushiki Kaisha Kobe Seiko Sho (JP)

(*) Notice: Subject to any disclaimer, the term of this patent is extended or adjusted under 35 U.S.C. 154(b) by 306 days.

(21) Appl. No.: 12/593,455

(22) PCT Filed: Mar. 19, 2008

(86) PCT No.: PCT/JP2008/055804
§ 371 (c)(1),
(2), (4) Date: Sep. 28, 2009

(87) PCT Pub. No.: WO2008/123329
PCT Pub. Date: Oct. 16, 2008

(65) Prior Publication Data
US 2010/0119861 A1 May 13, 2010

(30) Foreign Application Priority Data
Mar. 28, 2007 (JP) ................. 2007-084399

(51) Int. Cl.
B32B 15/04 (2006.01)
B32B 15/18 (2006.01)
B23K 9/18 (2006.01)
B23K 25/00 (2006.01)

(52) U.S. Cl. .......... 428/683; 428/684; 219/73; 219/73.2

(58) Field of Classification Search .................. 428/586, 428/682, 683, 684, 34.1, 939
See application file for complete search history.

(56) References Cited

U.S. PATENT DOCUMENTS
6,532,995 B1 3/2003 Asahi et al.
2005/0016980 A1 1/2005 Hara et al.
2007/0125462 A1* 6/2007 Asahi et al. .................. 148/593

FOREIGN PATENT DOCUMENTS
CN 2 586 391 A1 5/2006
EP 1 020 539 A2 7/2000
EP 1 500 457 A1 1/2005
JP 2002-115032 A 4/2002
(Continued)

*Primary Examiner* — Michael Lavilla
(74) *Attorney, Agent, or Firm* — DLA Piper LLP (US)

(57) ABSTRACT

A high-strength steel pipe has a tensile strength of 800 MPa or more and includes a weld metal having high cold-cracking resistance and high low-temperature toughness, wherein the weld metal contains C: 0.04% to 0.09% by mass, Si: 0.32% to 0.50% by mass, Mn: 1.4% to 2.0% by mass, Cu: less than 0.5% by mass, Ni: more than 0.9% by mass but not more than 4.2% by mass, Mo: 0.4% to 1.5% by mass, Cr: less than 0.5% by mass, V: less than 0.2% by mass, and the remainder of Fe and incidental impurities, and CS values calculated from the weld metal components using the equation $CS=5.1+1.4[Mo]-[Ni]-[Mn]-36.3[C]$ are equal to zero or more at both an internal surface and an external surface.

2 Claims, 1 Drawing Sheet

FOREIGN PATENT DOCUMENTS

| | | | |
|---|---|---|---|
| JP | 3519966 B2 | 4/2004 |
| JP | 3582461 B2 | 10/2004 |
| JP | 2005-040816 A | 2/2005 |
| JP | 3726721 B2 | 12/2005 |
| JP | 2007-044710 A | 2/2007 |
| WO | 2006/049036 A1 | 5/2006 |

* cited by examiner

INTERNAL WELD METAL SIDE

EXTERNAL WELD METAL SIDE

HIGH-STRENGTH WELDED STEEL PIPE INCLUDING WELD METAL HAVING HIGH COLD-CRACKING RESISTANCE AND METHOD FOR MANUFACTURING THE SAME

RELATED APPLICATIONS

This is a §371 of International Application No. PCT/JP2008/055804, with an international filing date of Mar. 19, 2008 (WO 2008/123329 A1, published Oct. 16, 2008), which is based on Japanese Patent Application No. 2007-084399, filed Mar. 28, 2007.

TECHNICAL FIELD

This disclosure relates to a high-strength steel pipe for use as a line pipe in the transportation of natural gas and crude oil and, more particularly, to a high-strength steel pipe including a high-toughness weld metal that is resistant to cracking, which becomes an issue particularly in high-strength steel pipes.

BACKGROUND

The strength of line pipes for use in the transportation of natural gas and crude oil has been increasing year by year to improve transportation efficiency by means of high-pressure transportation or on-site welding efficiency by means of thickness reduction. The demand for line pipes having a tensile strength above 800 MPa is being met.

While line pipes are generally seam-welded by submerged arc welding, seam welding of high-strength steel line pipes having a tensile strength above 800 MPa may cause weld metal cold cracking. It is known that the welding of high-strength steel of HT 80 or more (above 80 kg/mm$^2$(780 MPa)) may cause cold cracking. In general, cold cracking is prevented by a decrease in the hydrogen content of welding consumables and heat treatment for hydrogen diffusion (decrease of diffusible hydrogen), such as preheating, post heating, or interpass temperature management.

For example, Japanese Patent No. 3726721 discloses a method for preventing weld cracking, which includes defining the time period from welding to cooling to 100° C. and performing post heating. However, preheating and post heating in the seam welding of line pipes greatly decrease the production efficiency of line pipes. In industrial production of high-strength line pipes, therefore, it is important to prevent cold cracking of seam weld metal without performing preheating or post heating.

To prevent cold cracking, for example, Japanese Unexamined Patent Application Publication No. 2002-115032 proposes a method for preventing cold cracking by setting the retained austenite content of internal weld metal at 1% or more. However, with a weld metal having a strength as high as 800 MPa or more, even the inclusion of 1% or more of retained austenite sometimes cannot prevent cracking.

Japanese Patent No. 3582461 proposes a method for preventing weld metal cold cracking by setting the Ms point of the weld metal at 375° C. or less and thereby inducing tensile stress relaxation (decrease of residual tensile stress) due to transformation expansion. However, because this method principally aims to decrease the Ms point of weld metal, the proportion of a martensite structure, which is susceptible to cold cracking, increases. Decreasing the Ms point is therefore not always effective and may decrease low-temperature toughness.

To increase the weld metal strength to 800 MPa or more, it is essential to exploit the martensite structure. For example, Japanese Patent No. 3519966 discloses a low-temperature transformation microstructure, such as martensite and bainite, for higher strength. An internal weld metal having such a martensite structure recovers toughness owing to a tempering effect produced by welding heat input to an external surface. In the case that the location of the notch in a Charpy impact test specimen includes an overlap portion of the internal and external surfaces, therefore, it is relatively easy to secure weld metal toughness. However, an external weld metal is not tempered by other welding heat and includes an untempered structure (so-called fresh martensite structure). The fresh martensite is known to be of low toughness and be susceptible to hydrogen embrittlement. Thus, ensuring the toughness of unheated external weld metal becomes an issue.

It could therefore be helpful to provide a high-strength steel pipe that has a tensile strength of 800 MPa or more and includes a weld metal having high cold-cracking resistance and high low-temperature toughness.

SUMMARY

We examined the prevention of cold cracking and improvement of low-temperature toughness of a weld metal, which are particularly problematic in a high-strength steel pipe having a tensile strength of 800 MPa or more. As a result, we discovered a high-strength steel pipe that includes a weld metal having high cold-cracking resistance and high low-temperature toughness without performing heat treatment, such as preheating or post heating, of a weld.

We thus provide a high-strength welded steel pipe including a weld metal having low-temperature toughness and high cold-cracking resistance, in which the welded steel pipe is manufactured by double one layer submerged arc welding performed on the internal surface and the external surface of a base metal, both the base metal of the welded steel pipe and the weld metal have a tensile strength of 800 MPa or more, the weld metal contains C: 0.04% to 0.09% by mass, Si: 0.30% to 0.50% by mass, Mn: 1.4% to 2.0% by mass, Cu: less than 0.5% by mass, Ni: more than 0.9% by mass but not more than 4.2% by mass, Mo: 0.4% to 1.6% by mass, Cr: less than 0.3% by mass, V: less than 0.2% by mass, and the remainder of Fe and incidental impurities, and the CS values calculated from the weld metal components using the following equation (1) are equal to zero or more at both the internal surface side and the external surface side:

$$CS=5.1+1.4[Mo]-[Ni]-0.6[Mn]-36.3[C] \quad (1)$$

[Mo]: Mo content of weld metal (% by mass)
[Ni]: Ni content of weld metal (% by mass)
[Mn]: Mn content of weld metal (% by mass)
[C]: C content of weld metal (% by mass).

We also provide a method for manufacturing a high-strength welded steel pipe including a weld metal having high cold cracking resistance, the method including performing double one layer submerged arc welding on the internal surface and the external surface of a base metal having a tensile strength of 800 MPa or more using welding wires and a melt flux, the welding wire containing C: 0.01% to 0.14% by mass, Si: 0.25% to 0.7% by mass, Mn: 0.7% to 2.3% by mass, Cu: less than 1.0% by mass, Ni: 2.0% to 10.0% by mass, Mo: 0.8% to 3.8% by mass, Cr: less than 0.7% by mass, and V: less than 0.4% by mass, wherein the CS values calculated from the weld metal components using the equation (1) are equal to zero or more at both the internal surface side and the external surface side.

In our method for manufacturing a high-strength welded steel pipe, preferably, the base metal contains C: 0.03% to 0.12% by mass, Si: 0.01% to 0.5% by mass, Mn: 1.5% to 3.0% by mass, Al: 0.01% to 0.08% by mass, Nb: 0.01% to 0.08% by mass, Ti: 0.0005% to 0.024% by mass, N: 0.001% to 0.01% by mass, O: 0.004% by mass or less, S: 0.002% by mass or less, Ca: 0.0005% to 0.01% by mass, at least one selected from the group consisting of Cu: 0.01% to 1.3% by mass, Ni: 0.1% to 3.0% by mass, Mo: 0.01% to 1.0% by mass, Cr: 0.01% to 1.0% by mass, and V: 0.01% to 0.1% by mass, and the remainder of Fe and incidental impurities.

In our high-strength welded steel pipe, preferably, the base metal contains C: 0.03% to 0.12% by mass, Si: 0.01% to 0.5% by mass, Mn: 1.5% to 3.0% by mass, Al: 0.01% to 0.08% by mass, Nb: 0.01% to 0.08% by mass, Ti: 0.0005% to 0.024% by mass, N: 0.001% to 0.01% by mass, O: 0.004% by mass or less, S: 0.002% by mass or less, Ca: 0.0005% to 0.01% by mass, at least one selected from the group consisting of Cu: 0.01% to 1.3% by mass, Ni: 0.1% to 3.0% by mass, Mo: 0.01% to 1.0% by mass, Cr: 0.01% to 1.0% by mass, and V: 0.01% to 0.1% by mass, and the remainder of Fe and incidental impurities.

We provide a high-strength steel pipe that has high cold-cracking resistance and a tensile strength above 800 MPa and that includes a high-toughness weld metal, while preventing transverse cracking of seam weld metal without performing heat treatment, such as preheating or post heating.

DETAILED DESCRIPTION

Figure 1:
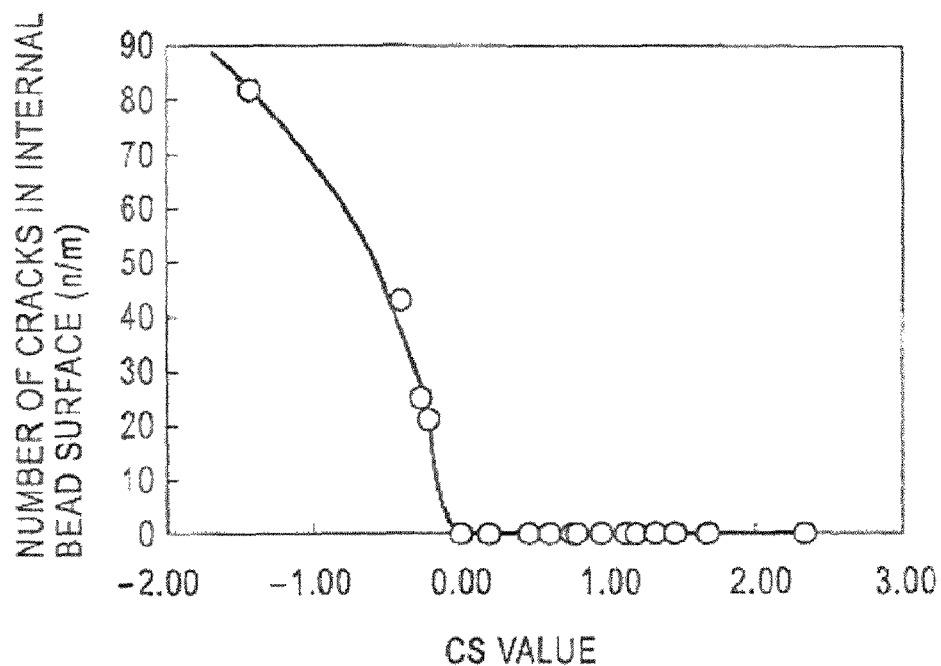
FIG. 1 is a graph showing the relationship between the CS value and weld metal cracking.

In general, a submerged arc welding material used for high-strength steel is an agglomerated flux. This is because a low-hydrogen weld metal and a highly basic flux can be easily provided and thereby a high-toughness weld metal can be easily provided. However, the agglomerated flux has a low particle strength and is easily pulverized to a powder. Thus, repeated use and pneumatic transportation of the agglomerated, flux are difficult. The agglomerated flux requires complicated dryness control owing to its high hygroscopicity and exhibits incomplete penetration. The agglomerated flux is therefore not generally used as a submerged arc welding material for UOE steel pipes and spiral steel pipes.

Accordingly, we provide a welded steel pipe having high low-temperature toughness that is free from weld metal cold cracking even using a melt flux, which may have the quantity of diffusible hydrogen slightly higher than that of the agglomerated flux, and a method for manufacturing the welded steel pipe. The quantity of diffusible hydrogen of a melt flux is at most 5 cc/100 g.

UOE steel pipes are manufactured by forming a pipe by U-pressing and O-pressing, tack-welding butted ends of pipes from the external surface side, performing one layer submerged arc welding on the internal surface side and then one layer submerged arc welding on the external surface side, and subsequently shaping the pipe by pipe expanding. In the manufacture of high-strength steel pipes, transverse cracking of weld metal is a great problem. Cracking mainly occurs in internal weld metal. Although a crack may also appear in external weld metal, the crack generally runs from internal weld metal. Close observation of a crack showed that cracking mostly occurred from internal weld metal undergoing a thermal effect directly under external weld metal. Exceptionally, a small transverse crack having a size of approximately 1 mm was shown to appear sometimes in external weld metal.

A fracture surface analysis showed that these cracks were caused by cold cracking (hydrogen embrittlement cracking). As a result of diligent and repeated investigations on the prevention of the cold cracking, we found that cracking is closely related to the solidification mode of weld metal.

To increase the strength of a weld metal used in a solidified state, a strengthening element, such as C, Mn, Ni, Cr, or Mo, must be added. Pcm of 0.25% by mass or more is a criterion for achieving a strength of 800 MPa or more. It was found that even in the case that weld metals to which a large amount of alloying element was added had the same strength, some of the weld metals had significant transverse cracks, but others had no crack. A detailed examination showed that cracking occurred on a high carbon side relative to the peritectic point in an iron-carbon binary system phase diagram, that is, through the primary solidification phase of a ferrite phase, a subsequent three-phase solidification state of a liquid phase+a ferrite phase+an austenite phase, and the final solidification mode of the liquid phase and the austenite phase. On the other hand, in the case that no cracking occurred, it was found that the primary solidification phase was the ferrite phase, but the final solidification mode was three-phase solidification of a liquid phase+a ferrite phase+an austenite phase. In other words, cold cracking occurred in the absence of the ferrite phase in the final solidification phase. It is known that, in mild steel and steel having a strength on the order of 50 kg/mm$^2$, the final solidification mode of a liquid phase+an austenite phase is observed at a C content of 0.12% by mass or more. Because general weld metals are designed to contain 0.10% by mass or less of C, the final solidification mode rarely has a liquid phase+an austenite phase. However, in high-strength steels having a strength above 800 MPa, because austenite forming elements, such as C, Mn, and Ni, are increased to strengthen the steels, the final solidification phase may be a liquid phase+an austenite phase even at a low C content. In such a case, weld metal has a transverse crack.

The solidification mode of such a weld metal can be controlled by balancing the amounts of austenite forming elements and ferrite forming elements. More specifically, a ferrite phase can be stably crystallized in the final solidification phase when the chemical composition of weld metal is determined so that the following CS value is equal to zero or more:

$$CS=5.1+1.4[Mo]-[Ni]-0.6[Mn]-36.3[C] \quad (1)$$

[Mo]: Mo content of weld metal (% by mass)
[Ni]: Ni content of weld metal (% by mass)
[Mn]: Mn content of weld metal (% by mass)
[C]: C content of weld metal (% by mass).

In a high-strength weld metal having a chemical composition in this range, transverse cracking can be prevented. FIG. 1 shows the relationship between the CS value and the number of cracks in the internal surface of weld metal. While FIG. 1 shows the number of cracks in the internal surface (that is, surface cracks on the internal surface side of weld metal), the similar tendency is observed on the external surface side of the weld metal. As is clear from FIG. 1, no weld metal crack occurs at CS≧zero.

The CS value indicates the peritectic point in an Fe—C pseudo-binary system phase diagram obtained through equilibrium calculation and, in more detail, a point slightly shifted to the positive side, that is, the ferrite solidification side of the peritectic point obtained from the calculation. In consideration of the solidification mode of weld metal, which is a nonequilibrium reaction, and alterations in the peritectic point due to concentration fluctuations, cracking is completely prevented at this point.

The reason for the prevention of cracking is assumed as follows. Impurities, such as P and S, can dissolve in the ferrite phase but are less soluble in the austenite phase. In the case that the final solidification mode includes no ferrite phase, impurities, such as P and S, are concentrated in a liquid phase and segregate at austenite grain boundaries as a final solidified portion. The fracture surface of a transverse crack is principally constituted of intergranular cracking, and the impurity segregation is thought to decrease the grain boundary strength and thereby cause transverse cracking. On the other hand, in the case that the final solidification phase includes the ferrite phase, impurities dissolve in the ferrite phase and are less concentrated in a final solidified portion. In addition, the solid phase in solidification is mainly composed of the ferrite phase, and the ferrite phase is transformed into the austenite phase by diffusion in a subsequent cooling process. This is accompanied by grain boundary migration and causes a discrepancy between a final solidified portion containing large amounts of impurities and the austenite grain boundaries. The transverse cracking is probably prevented for such a reason. At a negative CS value, weld metal toughness also decreases. This result is consistent with the theory of grain boundary segregation of impurities described above.

In the equation of the CS value, Mo, which is a ferrite forming element at a high temperature of 1500° C. or more, has a plus sign, and C, Ni, and Mn, which are austenite forming elements have a minus sign.

In the solidification mode control of a stainless steel weld metal, no more than approximately 1% to 2% by mass of Cr, which is a representative ferrite forming element and can be treated as Cr equivalent, does not significantly alter the peritectic point, which is a branch point of the solidification mode. Hence, there is no need to consider Cr in the equation of the CS value. However, Cr can form a carbide at grain boundaries and decrease cold-cracking resistance. Unlike Mo, Cr functions as an austenite forming element at a temperature of 1000° C. or less and as a strong austenite forming element at a temperature of approximately 500° C., at which bainite transformation occurs. The addition of 0.3% by mass or more of Cr therefore prevents the bainite transformation of a weld metal and increases a martensite structure, thus decreasing toughness, particularly of external weld metal. However, a small amount of Cr effectively increases the weld metal strength. Thus, the Cr content must be less than 0.3% by mass.

The C content of weld metal must range from 0.04% to 0.09% by mass. The addition of less than 0.04% by mass of C results in an insufficient weld metal strength and induces hot cracking. The addition of more than 0.09% by mass of C results in a higher carbide content of weld metal, thus decreasing toughness. The martensite toughness is also decreased. Preferably, the C content ranges from 0.05% to 0.07% by mass.

Si accelerates the segregation of P and S and thereby not only increases the incidence of cracking but also retards the diffusion of C. Although being a ferrite forming element, Si therefore stabilizes austenite, accelerates the formation of martensite, and decreases weld metal toughness. Thus, the Si content must be 0.50% by mass or less. However, an excessively low Si content results in an increase in the oxygen content of weld metal, thus decreasing toughness. Thus, the Si content must be 0.30% by mass or more.

The Mn content must range from 1.4% to 2.0% by mass. Mn not only accelerates the solidification and segregation of P and the occurrence of cracking, but also increases the stacking-fault energy, thus having a significant austenite stabilizing effect at 800° C. or less. Mn therefore prevents bainite transformation and accelerates the occurrence of martensite. The addition of a large amount of Mn decreases weld metal toughness. Thus, the Mn content must be 2.0% by mass or less. However, the Mn content below 1.4% by mass results in a higher oxygen content of weld metal and may decrease toughness. Thus, the Mn content must be 1.4% by mass or more. Preferably, the Mn content ranges from 1.5% to 1.8% by mass.

The Cu content must be less than 0.5% by mass. Cu increases the temperature range between the liquidus line and the solidus line and increases cold cracking sensitivity as well as the incidence of hot cracking. Thus, the Cu content must be less than 0.5% by mass.

Ni is an important element to improve the low-temperature toughness of a high-strength steel. Unlike Mn, Ni decreases the stacking-fault energy and rarely mechanically stabilizes austenite, thus ensuring ductility. Thus, more than 0.9% by mass of Ni must be added to improve toughness. Preferably, 2.0% by mass or more of Ni is added. However, because Ni chemically stabilizes austenite, the addition of a large amount of Ni prevents the ferrite phase from crystallizing in the final solidification phase, thus causing cold cracking. While balancing with Mo, C, and Mn, Ni must therefore be added in such a manner that the CS value is not negative. The maximum Ni content is approximately 4.2% by mass.

Mo is a very important element as a ferrite forming element to control the solidification mode of weld metal. Mo also has very important functions of destabilizing austenite, allowing bainite to be formed in a weld metal microstructure, and improving toughness. Thus, 0.4% by mass or more of Mo must be added. However, more than 1.6% by mass of Mo decreases toughness, particularly of external weld metal. Thus, the Mo content must range from 0.4% to 1.6% by mass.

Although V contributes to an increased weld metal strength, the addition of 0.2% by mass or more of V decreases toughness, particularly of external weld metal. Thus, the V content must be less than 0.2% by mass.

While it is desirable that impurities, such as P and S, be as little as possible, the tradeoff for less impurities is a higher cost. The advantages of this disclosure can be achieved at 0.016% by mass or less of P and 0.006% by mass or less of S.

Weld metal may contain additional elements, such as Al, Ti, Nb, and B, for refining in welding. Preferably, the oxygen content of weld metal ranges from 0.01% to 0.04% by mass. While it is desirable that the nitrogen content be as little as possible, the nitrogen content is preferably 0.010% by mass or less.

The components of welding wire are limited for the following reasons.

The C content is set in the range of 0.01% to 0.14% by mass to ensure the C content required for weld metal in consideration of dilution by base metal and incoming C from the atmosphere.

The Si content is set in the range of 0.25% to 0.7% by mass to ensure the Si content required for weld metal in consideration of dilution by base metal and the reduction of $SiO_2$ in a flux.

The Mn content is set in the range of 0.7% to 2.3% by mass to ensure the Mn content required for weld metal in consideration of dilution by base metal and the consumption by deoxidation.

The Cu content is set at less than 1.0% by mass to ensure the Cu content required for weld metal.

The Ni content is set in the range of 2.0% to 10.0% by mass to ensure the Ni content required for weld metal.

The Mo content is set in the range of 0.8% to 3.8% by mass to ensure the Mo content required for weld metal.

The Cr content is set at less than 0.7% by mass to ensure the Cr content required for weld metal.

The V content is set at less than 0.4% by mass to ensure the V content required for weld metal.

While it is desirable that the P and S contents of a welding wire be as little as possible, 0.016% by mass or less of P and 0.006% by mass or less of S are desirable to achieve the advantages of this disclosure as a welding wire.

A welding wire can contain additional elements that can be contained in a weld metal. In general, welding is performed with multiple electrodes. It is therefore not necessary that each of welding wires satisfies the component ranges described above, and it is sufficient for the average composition obtained from the components of the electrode wires and the amount of melted wires to satisfy the ranges described above. The average composition of wires is determined on the assumption that the amount of melted wires is proportional to the welding current of each electrode.

The components of base metal are limited for the following reasons.

In a low-temperature transformation microstructure, C contributes to an increased strength through supersaturated solid solution. 0.03% by mass or more of C is required for this effect. However, more than 0.12% by mass of C results in a significant increase in the hardness of circumferential weld of a pipe, that is, seam weld metal affected by circumferential welding heat, thus increasing the incidence of weld cold cracking. Thus, the C content is set in the range of 0.03% to 0.12% by mass.

Si acts as a deoxidizing element and increases steel strength by solid solution strengthening. Less than 0.01% by mass of Si cannot produce this effect, and more than 0.5% by mass of Si decreases toughness significantly. Thus, the Si content is set in the range of 0.01% to 0.5%.

Mn acts as a hardenability improving element. The effect is achieved at a Mn content of 1.5% by mass or more. In a continuous casting process, because the Mn concentration significantly increases at a central segregation zone, more than 3.0% by mass of Mn may cause delayed fracture in the segregation zone. Thus, the Mn content is set in the range of 1.5% to 3.0% by mass.

Al acts as a deoxidizing element. Although 0.01% by mass or more of Al has a sufficient deoxidizing effect, more than 0.08% by mass of Al may decrease cleanliness in steel and thereby decreases toughness. Thus, the Al content is set in the range of 0.01% to 0.08% by mass.

Nb can expand an austenite non-recrystallization region in hot rolling. In particular, 0.01% by mass or more of Nb is included to provide the non-recrystallization region at 950° C. or less. However, more than 0.08% by mass of Nb significantly degrades a HAZ in welding and weld metal toughness. Thus, the Nb content is set in the range of 0.01% to 0.08% by mass.

Ti can form a nitride and is effective to decrease the amount of N dissolved in steel. Because a TiN precipitate has a pinning effect, Ti can prevent coarsening of austenite grains, thus contributing to improved toughness of base metal and a HAZ. Although 0.0005% by mass or more of Ti is required to achieve a desired pinning effect, more than 0.024% by mass of Ti can form a carbide, and precipitation hardening due to the carbide decreases toughness significantly. Thus, the Ti content is set in the range of 0.0005% to 0.024% by mass.

N is generally present in steel as an incidental impurity. As described above, N, together with Ti, can form TiN, which prevents coarsening of austenite grains. 0.001% by mass or more of N is required to produce a desired pinning effect. However, at more than 0.01% by mass of N, adverse effects of dissolved N are significant when TiN decomposes in a weld, particularly in a HAZ heated to 1450° C. or more in the vicinity of a fusion line. Thus, the N content is set in the range of 0.001% to 0.01% by mass.

Cu, Ni, Cr, Mo, and V act as hardenability improving elements. One or two or more of these elements in the amounts described below may be added to increase strength.

0.01% by mass or more of Cu contributes to improved hardenability of steel. However, more than 1.3% by mass of Cu results in an increase in the Cu content of weld metal and thereby causes hot cracking of the weld metal. Thus, when Cu is added, the Cu content is set in the range of 0.01% to 1.3% by mass.

The addition of 0.1% by mass or more of Ni contributes to improved hardenability of steel. In particular, although the addition of a large amount of Ni does not decrease toughness and effectively increases toughness, Ni is an expensive element, and the effect levels off above 3% by mass. Thus, when Ni is added, the Ni content is set in the range of 0.1% to 3% by mass.

Although the addition of 0.01% by mass or more of Cr also contributes to improved hardenability of steel, more than 1.0% by mass of Cr decreases toughness. Thus, when Cr is added, the Cr content is set in the range of 0.01% to 1.0% by mass.

Although the addition of 0.01% by mass or more of Mo also contributes to improved hardenability of steel, more than 1.0% by mass of Mo decreases toughness. Thus, when Mo is added, the Mo content is set in the range of 0.01% to 1.0% by mass.

V can form a carbonitride and thereby contributes to precipitation hardening, in particular prevention of softening of a HAZ. Although this effect is produced by 0.01% by mass or more of V, more than 0.1% by mass of V results in significant precipitation hardening and low toughness. Thus, when V is added, the V content is set in the range of 0.01% to 0.1% by mass.

In a steelmaking process, at a Ca content below 0.0005% by mass, because a deoxidation reaction is predominant, CaS is scarcely formed, and therefore toughness is not improved. At a Ca content above 0.01% by mass, coarse CaO tends to be formed, thus decreasing toughness, including a base metal, causing nozzle blockage of a ladle, and decreasing productivity. Thus, the Ca content is set in the range of 0.0005% to 0.01% by mass.

O and S are incidental impurities, and their maximum contents are specified. The O content is 0.004% by mass or less for the prevention of the formation of coarse inclusions having adverse effects on toughness.

The addition of Ca decreases the formation of MnS. However, at a high S content, even morphology control using Ca cannot decrease the formation of MnS. Thus, the S content is set at 0.002% by mass or less.

After a steel sheet containing the components described above is formed into a pipe, abutting portions are tack-welded. Inner surface welding and subsequent external surface welding are then performed using the welding consumables described. Pipe expanding at a pipe expanding ratio of 2% or less is then performed to produce a high-strength steel pipe having a high cold-cracking resistance and high weld toughness.

EXAMPLES

A steel sheet shown in Table 1 was formed into a pipe by U-pressing and O-pressing and was tack-welded by gas-shielded arc welding. Double one layer submerged arc welding was then performed on the internal and external surfaces. Table 2 shows the components of a welding wire used in the submerged arc welding. Steel sheets B and E, which had a high S content, had an insufficient Charpy impact value of less than 200 J.

TABLE 1

| Steel sheet | Thickness (mm) | Components (mass %) | | | | | | | | | |
|---|---|---|---|---|---|---|---|---|---|---|---|
| | | C | Si | Mn | P | S | Ni | Cr | Mo | Cu | V |
| A | 18.0 | 0.075 | 0.35 | 1.83 | 0.008 | 0.002 | 0.15 | 0.25 | 0.21 | 0.15 | 0.035 |
| B | 18.0 | 0.065 | 0.15 | 1.95 | 0.011 | 0.003 | 0.25 | 0.04 | 0.3 | 0.25 | 0.050 |
| C | 18.0 | 0.057 | 0.25 | 2.05 | 0.007 | 0.001 | 0.35 | 0.02 | 0.33 | 0.21 | 0.050 |
| D | 18.0 | 0.065 | 0.10 | 1.73 | 0.010 | 0.001 | 0.15 | 0.03 | 0.23 | 0.28 | 0.010 |
| E | 18.0 | 0.045 | 0.15 | 1.54 | 0.011 | 0.003 | 0.02 | 0.46 | 0.03 | 0.02 | 0.008 |

| Steel sheet | Components (mass %) | | | | | | | TS (MPa) | $vE_{-30}$ (J) |
|---|---|---|---|---|---|---|---|---|---|
| | Nb | Ti | Al | B | O | N | Ca | | |
| A | 0.05 | 0.02 | 0.034 | 0.0001 | 0.0012 | 0.0034 | 0.0021 | 986 | 236 |
| B | 0.04 | 0.01 | 0.026 | 0.0001 | 0.0023 | 0.0030 | 0.0025 | 942 | 188 |
| C | 0.04 | 0.01 | 0.022 | 0.0001 | 0.0019 | 0.0042 | 0.0018 | 966 | 241 |
| D | 0.05 | 0.01 | 0.025 | 0.0002 | 0.0015 | 0.0051 | 0.0026 | 854 | 281 |
| E | 0.05 | 0.01 | 0.021 | 0.0000 | 0.0045 | 0.0050 | 0.0014 | 831 | 183 |

TABLE 2

| Welding wire | Components (mass %) | | | | | | | | | | | | |
|---|---|---|---|---|---|---|---|---|---|---|---|---|---|
| | C | Si | Mn | P | S | Ni | Cr | Mo | Cu | V | Ti | Al | N |
| a | 0.15 | 0.40 | 0.88 | 0.006 | 0.003 | 5.8 | 0.76 | 2.4 | 0.0 | 0.2 | 0.003 | 0.040 | 0.0052 |
| b | 0.03 | 0.35 | 1.07 | 0.006 | 0.003 | 6.0 | 0.04 | 2.6 | 0.0 | 0.0 | 0.000 | 0.033 | 0.0051 |
| c | 0.06 | 0.36 | 1.35 | 0.007 | 0.003 | 6.0 | 0.91 | 3.1 | 0.0 | 0.2 | 0.003 | 0.045 | 0.0054 |
| d | 0.06 | 0.41 | 1.35 | 0.007 | 0.003 | 8.7 | 0.03 | 2.6 | 0.0 | 0.2 | 0.003 | 0.045 | 0.0042 |
| e | 0.05 | 0.20 | 1.35 | 0.008 | 0.002 | 12.0 | 0.03 | 2.0 | 0.0 | 0.0 | 0.007 | 0.030 | 0.0040 |
| f | 0.08 | 0.31 | 2.24 | 0.007 | 0.003 | 7.5 | 0.03 | 2.2 | 0.0 | 0.0 | 0.010 | 0.032 | 0.0042 |
| g | 0.02 | 0.33 | 1.83 | 0.009 | 0.003 | 5.8 | 0.03 | 4.1 | 0.2 | 0.1 | 0.008 | 0.024 | 0.0052 |
| h | 0.03 | 0.41 | 2.81 | 0.008 | 0.002 | 7.1 | 0.80 | 0.6 | 0.3 | 0.2 | 0.009 | 0.012 | 0.0048 |
| i | 0.08 | 0.37 | 1.88 | 0.008 | 0.002 | 4.2 | 0.61 | 2.3 | 1.1 | 0.2 | 0.011 | 0.031 | 0.0033 |
| j | 0.08 | 0.36 | 1.75 | 0.008 | 0.003 | 6.1 | 0.01 | 2.7 | 0.0 | 0.5 | 0.008 | 0.033 | 0.0040 |
| k | 0.10 | 0.34 | 2.01 | 0.007 | 0.001 | 2.2 | 0.03 | 1.5 | 0.8 | 0.1 | 0.007 | 0.012 | 0.0040 |
| l | 0.10 | 0.36 | 0.73 | 0.006 | 0.005 | 2.7 | 0.21 | 1.0 | 0.0 | 0.0 | 0.007 | 0.011 | 0.0038 |
| m | 0.08 | 0.21 | 1.97 | 0.011 | 0.004 | 2.4 | 0.41 | 1.6 | 0.2 | 0.0 | 0.010 | 0.023 | 0.0036 |
| n | 0.04 | 0.33 | 1.22 | 0.011 | 0.003 | 10.7 | 0.03 | 2.4 | 0.2 | 0.0 | 0.015 | 0.021 | 0.0033 |
| o | 0.01 | 0.32 | 0.73 | 0.011 | 0.003 | 8.4 | 0.02 | 3.8 | 0.2 | 0.3 | 0.008 | 0.016 | 0.0035 |
| p | 0.08 | 0.40 | 1.69 | 0.008 | 0.002 | 1.8 | 0.64 | 3.2 | 0.2 | 0.1 | 0.008 | 0.015 | 0.0034 |

For various combinations of these plates sheets and welding wires, double one layer welding on the internal and external surfaces was then performed by four-electrode welding. Tables 3 and 4 show the welding conditions. A CaO—CaF₂—SiO₂ high basicity melt flux was used in submerged arc welding. The quantity of diffusible hydrogen according to JIS Z 3118 of this flux was 4.6 cc/100 g.

Tables 5 and 6 show the chemical compositions and characteristics of weld metals prepared using these base metals and welding consumables by the four-electrode submerged arc welding. Table 7 shows the average compositions of the welding wires. The average compositions of the welding wires were calculated by multiplying the wire compositions of the electrodes by their respective electric currents, sum-

TABLE 3

| Internal first electrode | | Internal second electrode | | Internal third electrode | | Internal fourth electrode | | Welding |
|---|---|---|---|---|---|---|---|---|
| Current (A) | Voltage (V) | Current (A) | Voltage (V) | Current (A) | Voltage (V) | Current (A) | Voltage (V) | Speed (m/min) |
| 1070 | 34 | 910 | 36 | 800 | 40 | 750 | 40 | 2.20 |

TABLE 4

| External first electrode | | External second electrode | | External third electrode | | External fourth electrode | | Welding |
|---|---|---|---|---|---|---|---|---|
| Current (A) | Voltage (V) | Current (A) | Voltage (V) | Current (A) | Voltage (V) | Current (A) | Voltage (V) | Speed (m/min) |
| 1140 | 32 | 910 | 35 | 775 | 40 | 605 | 40 | 2.30 | ming the products, and dividing the summation by the total electrode current. In No. 20, two-electrode submerged arc welding was performed. The welding conditions for the internal surface side were a first electrode: 920 A-36 V, a second electrode: 690 A-44 V, and a welding speed: 1.1 m/min. The welding conditions for the external surface side were a first electrode: 1000 A-36 V, a second electrode: 750 A-45 V, and a welding speed: 1.0 m/min.

TABLE 5

| | Base metal | Welding Wire | Internal surface/ External Surface | Components (mass %, B: mass ppm) | | | | | | | | | | | |
|---|---|---|---|---|---|---|---|---|---|---|---|---|---|---|---|
| | | | | C | Si | Mn | P | S | Ni | Cr | Mo | Cu | V | Nb | Ti |
| 1 | A | Cccc | Internal Surface | 0.067 | 0.49 | 1.65 | 0.007 | 0.003 | 2.37 | 0.48 | 1.31 | 0.10 | 0.10 | 0.031 | 0.012 |
| | | Cccc | External Surface | 0.066 | 0.49 | 1.63 | 0.007 | 0.003 | 2.35 | 0.50 | 1.29 | 0.10 | 0.10 | 0.029 | 0.011 |
| 2 | B | Eeee | Internal Surface | 0.058 | 0.23 | 1.72 | 0.010 | 0.003 | 4.72 | 0.03 | 0.95 | 0.16 | 0.03 | 0.025 | 0.008 |
| | | Eeee | External Surface | 0.058 | 0.24 | 1.70 | 0.011 | 0.003 | 4.67 | 0.03 | 0.93 | 0.16 | 0.03 | 0.023 | 0.007 |
| 3 | A | Aaaa | Internal Surface | 0.098 | 0.51 | 1.47 | 0.008 | 0.003 | 2.30 | 0.42 | 1.03 | 0.10 | 0.10 | 0.031 | 0.012 |
| | | Aaaa | External Surface | 0.097 | 0.51 | 1.46 | 0.009 | 0.004 | 2.27 | 0.44 | 1.02 | 0.10 | 0.10 | 0.029 | 0.011 |
| 4 | A | Ffff | Internal Surface | 0.075 | 0.46 | 1.99 | 0.009 | 0.003 | 2.94 | 0.16 | 0.95 | 0.10 | 0.03 | 0.031 | 0.015 |
| | | Ffff | External Surface | 0.074 | 0.46 | 1.95 | 0.010 | 0.004 | 2.91 | 0.15 | 0.93 | 0.10 | 0.02 | 0.029 | 0.013 |
| 5 | B | Gggg | Internal Surface | 0.047 | 0.30 | 1.90 | 0.010 | 0.003 | 2.36 | 0.03 | 1.75 | 0.21 | 0.07 | 0.025 | 0.008 |
| | | Gggg | External Surface | 0.047 | 0.31 | 1.87 | 0.011 | 0.004 | 2.33 | 0.03 | 1.72 | 0.21 | 0.07 | 0.023 | 0.008 |
| 6 | D | Hhhh | Internal Surface | 0.051 | 0.30 | 2.14 | 0.008 | 0.004 | 2.77 | 0.31 | 0.39 | 0.30 | 0.09 | 0.028 | 0.010 |
| | | Hhhh | External Surface | 0.050 | 0.31 | 2.10 | 0.008 | 0.005 | 2.74 | 0.34 | 0.37 | 0.29 | 0.09 | 0.026 | 0.009 |
| 7 | B | Iiii | Internal Surface | 0.069 | 0.32 | 1.92 | 0.009 | 0.003 | 1.75 | 0.24 | 1.07 | 0.59 | 0.11 | 0.025 | 0.009 |
| | | Iiii | External Surface | 0.068 | 0.33 | 1.89 | 0.009 | 0.003 | 1.73 | 0.27 | 1.05 | 0.58 | 0.11 | 0.023 | 0.009 |
| 8 | C | Jjjj | Internal Surface | 0.064 | 0.40 | 1.94 | 0.011 | 0.004 | 2.54 | 0.02 | 1.22 | 0.13 | 0.22 | 0.025 | 0.008 |
| | | Jjjj | External Surface | 0.064 | 0.41 | 1.91 | 0.011 | 0.003 | 2.50 | 0.01 | 1.19 | 0.13 | 0.22 | 0.023 | 0.008 |
| 9 | A | Gghh | Internal Surface | 0.055 | 0.49 | 1.99 | 0.012 | 0.003 | 2.51 | 0.28 | 1.11 | 0.18 | 0.08 | 0.031 | 0.014 |
| | | Gghh | External Surface | 0.054 | 0.49 | 1.95 | 0.011 | 0.004 | 2.47 | 0.27 | 1.14 | 0.18 | 0.08 | 0.029 | 0.013 |
| 10 | C | Ccee | Internal Surface | 0.055 | 0.37 | 1.78 | 0.010 | 0.004 | 3.50 | 0.20 | 1.20 | 0.13 | 0.08 | 0.025 | 0.007 |
| | | Ccee | External Surface | 0.055 | 0.37 | 1.76 | 0.010 | 0.005 | 3.39 | 0.23 | 1.19 | 0.13 | 0.07 | 0.023 | 0.007 |
| 11 | B | Bccc | Internal Surface | 0.058 | 0.32 | 1.69 | 0.012 | 0.003 | 2.44 | 0.26 | 1.31 | 0.16 | 0.08 | 0.025 | 0.006 |
| | | Bccc | External Surface | 0.057 | 0.32 | 1.67 | 0.011 | 0.003 | 2.41 | 0.27 | 1.28 | 0.16 | 0.08 | 0.023 | 0.006 |
| 12 | A | Ggee | Internal Surface | 0.058 | 0.44 | 1.75 | 0.011 | 0.004 | 3.33 | 0.16 | 1.34 | 0.13 | 0.04 | 0.031 | 0.014 |
| | | Ggee | External Surface | 0.057 | 0.45 | 1.73 | 0.010 | 0.004 | 3.23 | 0.15 | 1.35 | 0.13 | 0.04 | 0.029 | 0.013 |
| 13 | A | Bbaa | Internal Surface | 0.075 | 0.49 | 1.51 | 0.010 | 0.003 | 2.35 | 0.28 | 1.08 | 0.10 | 0.06 | 0.031 | 0.012 |
| | | Bbaa | External Surface | 0.078 | 0.50 | 1.50 | 0.010 | 0.003 | 2.33 | 0.27 | 1.07 | 0.10 | 0.05 | 0.029 | 0.011 |
| 14 | A | Llll | Internal Surface | 0.084 | 0.49 | 1.41 | 0.011 | 0.004 | 1.12 | 0.22 | 0.51 | 0.10 | 0.02 | 0.031 | 0.014 |
| | | Kkkk | External Surface | 0.083 | 0.48 | 1.82 | 0.011 | 0.004 | 0.94 | 0.16 | 0.66 | 8.34 | 0.05 | 0.029 | 0.012 |
| 15 | E | Kkii | Internal Surface | 0.061 | 0.31 | 1.70 | 0.009 | 0.003 | 1.18 | 0.37 | 0.73 | 0.36 | 0.06 | 0.031 | 0.008 |
| | | Kkii | External Surface | 0.062 | 0.32 | 1.68 | 0.008 | 0.008 | 1.15 | 0.36 | 0.71 | 0.37 | 0.06 | 0.029 | 0.007 |
| 16 | B | Bbdd | Internal Surface | 0.056 | 0.33 | 1.66 | 0.009 | 0.003 | 2.90 | 0.04 | 1.18 | 0.16 | 0.06 | 0.025 | 0.006 |
| | | Ddbb | External Surface | 0.057 | 0.34 | 1.66 | 0.008 | 0.004 | 3.00 | 0.04 | 1.15 | 0.16 | 0.07 | 0.023 | 0.006 |

TABLE 5-continued

| | | | | C | Si | Mn | P | S | Ni | Cr | Mo | Cu | V | Nb | Ti |
|---|---|---|---|---|---|---|---|---|---|---|---|---|---|---|---|
| 17 | D | mmmm | Internal Surface | 0.070 | 0.20 | 1.82 | 0.010 | 0.002 | 1.01 | 0.17 | 0.74 | 0.23 | 0.01 | 0.028 | 0.010 |
| | | mmmm | External Surface | 0.070 | 0.20 | 1.79 | 0.010 | 0.002 | 1.00 | 0.18 | 0.72 | 0.23 | 0.01 | 0.026 | 0.009 |

| | | Components (mass %, B: mass ppm) | | | | Evaluation of weld metal | Number of cold cracks | Tensile Strength TS | | |
|---|---|---|---|---|---|---|---|---|---|---|
| | | Al | B | O | N | CS | cracking | (—) | (MPa) | vE$_{-35}$ (J) | Note |
| 1 | | 0.025 | 0 | 0.017 | 0.0059 | 1.13 | Pass | 0 | 1111 | 48 | Comparative Example (reduced toughness) |
| | | 0.022 | 0 | 0.018 | 0.0054 | 1.17 | Pass | 0 | 1110 | 39 | |
| 2 | | 0.018 | 0 | 0.034 | 0.0063 | −1.45 | Fail | 82 | 991 | 23 | Comparative Example (cold cracking) |
| | | 0.016 | 0 | 0.036 | 0.0066 | −1.40 | Fail | 6 | 981 | 12 | |
| 3 | | 0.024 | 0 | 0.017 | 0.0048 | −0.20 | Fail | 21 | 1087 | 59 | Comparative Example (cold cracking) |
| | | 0.021 | 0 | 0.018 | 0.0053 | −0.16 | Fail | 1 | 1084 | 38 | |
| 4 | | 0.022 | 0 | 0.017 | 0.0057 | −0.40 | Fail | 43 | 1041 | 49 | Comparative Example (cold cracking) |
| | | 0.019 | 0 | 0.019 | 0.0059 | −0.34 | Fail | 3 | 1026 | 24 | |
| 5 | | 0.016 | 0 | 0.026 | 0.0062 | 2.34 | Pass | 0 | 1060 | 47 | Comparative Example (reduced toughness) |
| | | 0.015 | 0 | 0.025 | 0.0051 | 2.36 | Pass | 0 | 1047 | 41 | |
| 6 | | 0.013 | 0 | 0.027 | 0.0045 | −0.26 | Fail | 25 | 883 | 54 | Comparative Example (cold cracking) |
| | | 0.012 | 0 | 0.025 | 0.0041 | −0.21 | Fail | 2 | 861 | 31 | |
| 7 | | 0.018 | 0 | 0.024 | 0.0037 | 1.20 | Fail | Unmeasurable | Unmeasurable | Unmeasurable | Comparative Example (hot cracking) |
| | | 0.016 | 0 | 0.026 | 0.0046 | 1.23 | Fail | Unmeasurable | Unmeasurable | Unmeasurable | |
| 8 | | 0.017 | 0 | 0.019 | 0.0063 | 0.78 | Pass | 0 | 1049 | 48 | Comparative Example (reduced toughness) |
| | | 0.015 | 0 | 0.020 | 0.0066 | 0.80 | Pass | 0 | 1038 | 44 | |
| 9 | | 0.018 | 0 | 0.017 | 0.0047 | 0.97 | Pass | 0 | 1043 | 106 | Example |
| | | 0.016 | 0 | 0.018 | 0.0042 | 1.10 | Pass | 0 | 1034 | 96 | |
| 10 | | 0.018 | 0 | 0.020 | 0.0057 | 0.21 | Pass | 0 | 1050 | 112 | Example |
| | | 0.017 | 0 | 0.021 | 0.0054 | 0.32 | Pass | 0 | 1049 | 101 | |
| 11 | | 0.021 | 0 | 0.026 | 0.0056 | 1.37 | Pass | 0 | 1032 | 122 | Example |
| | | 0.019 | 0 | 0.024 | 0.0052 | 1.39 | Pass | 0 | 1022 | 95 | |
| 12 | | 0.020 | 0 | 0.018 | 0.0066 | 0.48 | Pass | 0 | 1028 | 131 | Example |
| | | 0.018 | 0 | 0.020 | 0.0069 | 0.65 | Pass | 0 | 1018 | 114 | |
| 13 | | 0.023 | 0 | 0.017 | 0.0052 | 0.63 | Pass | 0 | 993 | 119 | Example |
| | | 0.020 | 0 | 0.018 | 0.0055 | 0.71 | Pass | 0 | 982 | 112 | |
| 14 | | 0.016 | 0 | 0.017 | 0.0062 | 0.80 | Pass | 0 | 861 | 146 | Example |
| | | 0.015 | 0 | 0.019 | 0.0066 | 1.00 | Pass | 0 | 852 | 138 | |
| 15 | | 0.013 | 1 | 0.021 | 0.0047 | 1.69 | Pass | 0 | 883 | 46 | Comparative Example (reduced toughness) |
| | | 0.012 | 1 | 0.022 | 0.0043 | 1.69 | Pass | 0 | 859 | 43 | |
| 16 | | 0.020 | 0 | 0.021 | 0.0042 | 0.82 | Pass | 0 | 955 | 113 | Example |
| | | 0.018 | 0 | 0.022 | 0.0041 | 0.64 | Pass | 0 | 966 | 95 | |
| 17 | | 0.016 | 0 | 0.036 | 0.0062 | 1.47 | Pass | 0 | 849 | 45 | Comparative Example (reduced toughness) |
| | | 0.014 | 0 | 0.039 | 0.0064 | 1.50 | Pass | 0 | 841 | 41 | |

TABLE 6

| Base metal | Welding wire | Internal surface/ External surface | Components (mass %, B: mass ppm) | | | | | | | | | | | |
|---|---|---|---|---|---|---|---|---|---|---|---|---|---|---|---|
| | | | C | Si | Mn | P | S | Ni | Cr | Mo | Cu | V | Nb | Ti |
| 18 | D | nnnn | Internal surface | 0.040 | 0.30 | 1.41 | 0.011 | 0.003 | 4.05 | 0.28 | 0.92 | 0.07 | 0.01 | 0.031 | 0.010 |
| | | nnnn | External surface | 0.041 | 0.31 | 1.41 | 0.010 | 0.003 | 3.98 | 0.26 | 0.91 | 0.08 | 0.01 | 0.029 | 0.010 |

TABLE 6-continued

| | | | | C | Si | Mn | P | S | Ni | Cr | Mo | Cu | V | Ti | |
|---|---|---|---|---|---|---|---|---|---|---|---|---|---|---|---|
| 19 | A | oooo | Internal surface | 0.050 | 0.47 | 1.41 | 0.009 | 0.002 | 3.27 | 0.15 | 1.56 | 0.15 | 0.14 | 0.031 | 0.014 |
| | | oooo | External surface | 0.050 | 0.47 | 1.41 | 0.009 | 0.002 | 3.23 | 0.14 | 1.54 | 0.16 | 0.14 | 0.029 | 0.013 |
| 20 | E | Ge | Internal surface | 0.040 | 0.27 | 1.57 | 0.010 | 0.003 | 3.23 | 0.28 | 1.24 | 0.05 | 0.03 | 0.031 | 0.008 |
| | | Ge | External surface | 0.040 | 0.28 | 1.56 | 0.010 | 0.003 | 3.20 | 0.26 | 1.23 | 0.06 | 0.03 | 0.029 | 0.007 |
| 21 | E | oonn | Internal surface | 0.036 | 0.30 | 1.23 | 0.011 | 0.003 | 3.56 | 0.28 | 1.22 | 0.07 | 0.07 | 0.031 | 0.009 |
| | | oonn | External surface | 0.036 | 0.30 | 1.23 | 0.010 | 0.003 | 3.53 | 0.26 | 1.21 | 0.08 | 0.07 | 0.029 | 0.008 |
| 22 | B | pppp | Internal surface | 0.071 | 0.33 | 1.87 | 0.009 | 0.004 | 0.81 | 0.25 | 1.36 | 0.20 | 0.06 | 0.021 | 0.009 |
| | | pppp | External surface | 0.072 | 0.34 | 1.83 | 0.010 | 0.003 | 0.79 | 0.28 | 1.34 | 0.20 | 0.07 | 0.020 | 0.009 |

| | Components (mass %, B: mass ppm) | | | | | Evaluation of weld metal cracking | Number of cold cracks (—) | Tensile Strength TS (MPa) | $vE_{-35}$ (J) | Note |
|---|---|---|---|---|---|---|---|---|---|---|
| | Al | B | O | N | CS | | | | | |
| 18 | 0.014 | 0 | 0.025 | 0.0060 | 0.02 | Pass | 0 | 903 | 148 | Example |
| | 0.012 | 0 | 0.027 | 0.0063 | 0.05 | Pass | 0 | 878 | 136 | |
| 19 | 0.018 | 0 | 0.017 | 0.0051 | 1.34 | Pass | 0 | 1118 | 121 | Example |
| | 0.016 | 0 | 0.019 | 0.0042 | 1.37 | Pass | 0 | 1088 | 112 | |
| 20 | 0.015 | 0 | 0.023 | 0.0042 | 1.22 | Pass | 0 | 953 | 133 | Example |
| | 0.014 | 0 | 0.021 | 0.0043 | 1.21 | Pass | 0 | 893 | 122 | |
| 21 | 0.013 | 0 | 0.022 | 0.0059 | 1.21 | Fail | Unmeasurable | Unmeasurable | Unmeasurable | Comparative Example (hot cracking) |
| | 0.012 | 0 | 0.023 | 0.0047 | 1.20 | Fail | Unmeasurable | Unmeasurable | Unmeasurable | |
| 22 | 0.017 | 0 | 0.021 | 0.0047 | 2.58 | Pass | 0 | 979 | 51 | Comparative Example (reduced toughness) |
| | 0.016 | 0 | 0.023 | 0.0063 | 2.56 | Pass | 0 | 958 | 42 | |

TABLE 7

| Welding wire | Internal surface/External surface | Components (mass %) | | | | | | | | | | | |
|---|---|---|---|---|---|---|---|---|---|---|---|---|---|
| | | C | Si | Mn | P | S | Ni | Cr | Mo | Cu | V | Ti | Al | N |
| 1 cccc | Internal surface | 0.06 | 0.36 | 1.35 | 0.007 | 0.003 | 6.0 | 0.9 | 3.1 | 0.0 | 0.2 | 0.003 | 0.045 | 0.0054 |
| cccc | External surface | 0.06 | 0.36 | 1.35 | 0.007 | 0.003 | 6.0 | 0.9 | 3.1 | 0.0 | 0.2 | 0.003 | 0.045 | 0.0054 |
| 2 eeee | Internal surface | 0.05 | 0.20 | 1.35 | 0.008 | 0.002 | 12.0 | 0.0 | 2.0 | 0.0 | 0.0 | 0.007 | 0.030 | 0.0040 |
| eeee | External surface | 0.05 | 0.20 | 1.35 | 0.008 | 0.002 | 12.0 | 0.0 | 2.0 | 0.0 | 0.0 | 0.007 | 0.030 | 0.0040 |
| 3 aaaa | Internal surface | 0.15 | 0.40 | 0.88 | 0.006 | 0.003 | 5.8 | 0.8 | 2.4 | 0.0 | 0.2 | 0.003 | 0.040 | 0.0052 |
| aaaa | External surface | 0.15 | 0.40 | 0.88 | 0.006 | 0.003 | 5.8 | 0.8 | 2.4 | 0.0 | 0.2 | 0.003 | 0.040 | 0.0052 |
| 4 ffff | Internal surface | 0.08 | 0.31 | 2.24 | 0.007 | 0.002 | 7.5 | 0.0 | 2.2 | 0.0 | 0.0 | 0.010 | 0.032 | 0.0042 |
| ffff | External surface | 0.08 | 0.31 | 2.24 | 0.007 | 0.002 | 7.5 | 0.0 | 2.2 | 0.0 | 0.0 | 0.010 | 0.032 | 0.0042 |
| 5 gggg | Internal surface | 0.02 | 0.33 | 1.83 | 0.009 | 0.003 | 5.8 | 0.0 | 4.1 | 0.2 | 0.1 | 0.008 | 0.024 | 0.0052 |
| gggg | External surface | 0.02 | 0.33 | 1.83 | 0.009 | 0.003 | 5.8 | 0.0 | 4.1 | 0.2 | 0.1 | 0.008 | 0.024 | 0.0052 |
| 6 hhhh | Internal surface | 0.03 | 0.41 | 2.81 | 0.008 | 0.002 | 7.1 | 0.8 | 0.6 | 0.3 | 0.2 | 0.009 | 0.012 | 0.0048 |
| hhhh | External surface | 0.03 | 0.41 | 2.81 | 0.008 | 0.002 | 7.1 | 0.8 | 0.6 | 0.3 | 0.2 | 0.009 | 0.012 | 0.0048 |
| 7 iiii | Internal surface | 0.08 | 0.37 | 1.88 | 0.008 | 0.002 | 4.2 | 0.6 | 2.3 | 1.1 | 0.2 | 0.011 | 0.031 | 0.0033 |
| iiii | External surface | 0.08 | 0.37 | 1.88 | 0.008 | 0.002 | 4.2 | 0.6 | 2.3 | 1.1 | 0.2 | 0.011 | 0.031 | 0.0033 |
| 8 jjjj | Internal surface | 0.08 | 0.36 | 1.75 | 0.008 | 0.003 | 6.1 | 0.0 | 2.7 | 0.0 | 0.5 | 0.008 | 0.033 | 0.0040 |
| jjjj | External surface | 0.08 | 0.36 | 1.75 | 0.008 | 0.003 | 6.1 | 0.0 | 2.7 | 0.0 | 0.5 | 0.008 | 0.033 | 0.0040 |
| 9 gghh | Internal surface | 0.02 | 0.37 | 2.26 | 0.009 | 0.003 | 6.4 | 0.4 | 2.6 | 0.2 | 0.2 | 0.008 | 0.019 | 0.0050 |
| gghh | External surface | 0.02 | 0.36 | 2.22 | 0.009 | 0.003 | 6.3 | 0.3 | 2.7 | 0.2 | 0.2 | 0.008 | 0.019 | 0.0050 |
| 10 ccee | Internal surface | 0.05 | 0.29 | 1.35 | 0.007 | 0.003 | 8.6 | 0.5 | 2.6 | 0.0 | 0.1 | 0.005 | 0.038 | 0.0048 |
| ccee | External surface | 0.06 | 0.30 | 1.35 | 0.007 | 0.003 | 8.4 | 0.6 | 2.7 | 0.0 | 0.1 | 0.005 | 0.039 | 0.0048 |
| 11 bccc | Internal surface | 0.05 | 0.36 | 1.27 | 0.007 | 0.003 | 6.0 | 0.6 | 2.9 | 0.0 | 0.1 | 0.002 | 0.041 | 0.0053 |
| bccc | External surface | 0.05 | 0.36 | 1.26 | 0.007 | 0.003 | 6.0 | 0.6 | 2.9 | 0.0 | 0.1 | 0.002 | 0.041 | 0.0053 |
| 12 ggee | Internal surface | 0.03 | 0.27 | 1.62 | 0.009 | 0.003 | 8.5 | 0.0 | 3.2 | 0.1 | 0.1 | 0.008 | 0.027 | 0.0047 |
| ggee | External surface | 0.03 | 0.28 | 1.64 | 0.009 | 0.003 | 8.3 | 0.0 | 3.3 | 0.1 | 0.1 | 0.008 | 0.026 | 0.0047 |
| 13 bbaa | Internal surface | 0.08 | 0.37 | 0.99 | 0.006 | 0.003 | 5.9 | 0.4 | 2.5 | 0.0 | 0.1 | 0.001 | 0.036 | 0.0051 |
| bbaa | External surface | 0.08 | 0.37 | 0.99 | 0.006 | 0.003 | 5.9 | 0.3 | 2.5 | 0.0 | 0.1 | 0.001 | 0.036 | 0.0051 |
| 14 llll | Internal surface | 0.10 | 0.36 | 0.73 | 0.006 | 0.005 | 2.7 | 0.2 | 1.0 | 0.0 | 0.0 | 0.007 | 0.011 | 0.0038 |
| Kkkk | External surface | 0.10 | 0.34 | 2.01 | 0.007 | 0.001 | 2.2 | 0.1 | 1.5 | 0.8 | 0.1 | 0.007 | 0.012 | 0.0040 |
| 15 kkii | Internal surface | 0.09 | 0.35 | 1.95 | 0.007 | 0.001 | 3.1 | 0.3 | 1.9 | 0.9 | 0.1 | 0.009 | 0.020 | 0.0037 |
| kkii | External surface | 0.09 | 0.35 | 1.96 | 0.007 | 0.001 | 3.0 | 0.3 | 1.8 | 0.9 | 0.1 | 0.009 | 0.020 | 0.0037 |
| 16 bbdd | Internal surface | 0.04 | 0.38 | 1.19 | 0.006 | 0.003 | 7.2 | 0.0 | 2.6 | 0.0 | 0.1 | 0.001 | 0.038 | 0.0047 |
| ddbb | External surface | 0.05 | 0.39 | 1.24 | 0.007 | 0.003 | 7.7 | 0.0 | 2.6 | 0.0 | 0.1 | 0.002 | 0.040 | 0.0046 |

TABLE 7-continued

| Welding wire | Internal surface/External surface | Components (mass %) | | | | | | | | | | | | |
|---|---|---|---|---|---|---|---|---|---|---|---|---|---|---|
| | | C | Si | Mn | P | S | Ni | Cr | Mo | Cu | V | Ti | Al | N |
| 17 mmmm | Internal surface | 0.08 | 0.21 | 1.97 | 0.011 | 0.004 | 2.4 | 0.4 | 1.6 | 0.2 | 0.2 | 0.010 | 0.023 | 0.0036 |
| mmmm | External surface | 0.08 | 0.21 | 1.97 | 0.011 | 0.004 | 2.4 | 0.4 | 1.6 | 0.2 | 0.2 | 0.010 | 0.023 | 0.0036 |
| 18 nnnn | Internal surface | 0.04 | 0.33 | 1.22 | 0.011 | 0.003 | 10.7 | 0.0 | 2.4 | 0.2 | 0.2 | 0.015 | 0.021 | 0.0033 |
| nnnn | External surface | 0.04 | 0.33 | 1.22 | 0.011 | 0.003 | 10.7 | 0.0 | 2.4 | 0.2 | 0.2 | 0.015 | 0.021 | 0.0033 |
| 19 oooo | Internal surface | 0.01 | 0.32 | 0.73 | 0.011 | 0.003 | 8.4 | 0.0 | 3.8 | 0.2 | 0.2 | 0.008 | 0.016 | 0.0035 |
| oooo | External surface | 0.01 | 0.32 | 0.73 | 0.011 | 0.003 | 8.4 | 0.0 | 3.8 | 0.2 | 0.2 | 0.008 | 0.016 | 0.0035 |
| 20 ge | Internal surface | 0.03 | 0.27 | 1.62 | 0.009 | 0.003 | 8.5 | 0.0 | 3.2 | 0.1 | 0.1 | 0.008 | 0.027 | 0.0047 |
| ge | External surface | 0.03 | 0.27 | 1.62 | 0.009 | 0.003 | 8.5 | 0.0 | 3.2 | 0.1 | 0.1 | 0.008 | 0.027 | 0.0047 |
| 21 oonn | Internal surface | 0.02 | 0.32 | 0.94 | 0.011 | 0.003 | 9.3 | 0.0 | 3.2 | 0.2 | 0.2 | 0.011 | 0.018 | 0.0034 |
| oonn | External surface | 0.02 | 0.32 | 0.94 | 0.011 | 0.003 | 9.3 | 0.0 | 3.2 | 0.2 | 0.2 | 0.011 | 0.018 | 0.0034 |
| 22 pppp | Internal surface | 0.08 | 0.40 | 1.69 | 0.008 | 0.002 | 1.8 | 0.6 | 3.2 | 0.2 | 0.1 | 0.008 | 0.015 | 0.0034 |
| pppp | External surface | 0.08 | 0.40 | 1.69 | 0.008 | 0.002 | 1.8 | 0.6 | 3.2 | 0.2 | 0.1 | 0.008 | 0.015 | 0.0034 |

Nos. 9 to 14, 16, and 18 to 20 are inventive examples. They had a CS value of zero or more and no weld metal cold cracking. Cracking was examined as follows. Seventy-two hours after welding, an on-bead ultrasonic inspection test was performed in the direction of a welding line and in the direction perpendicular to the welding line to search for cracking. In addition, because cracks are often observed in the weld metal surface, surface cracking was examined by magnetic-particle testing. Table 5 shows the results of the ultrasonic inspection test and the magnetic-particle testing, in which Pass indicates that no crack was observed, and Fail indicates that a crack was observed in the ultrasonic inspection test and/or the magnetic-particle testing.

Figure 2:
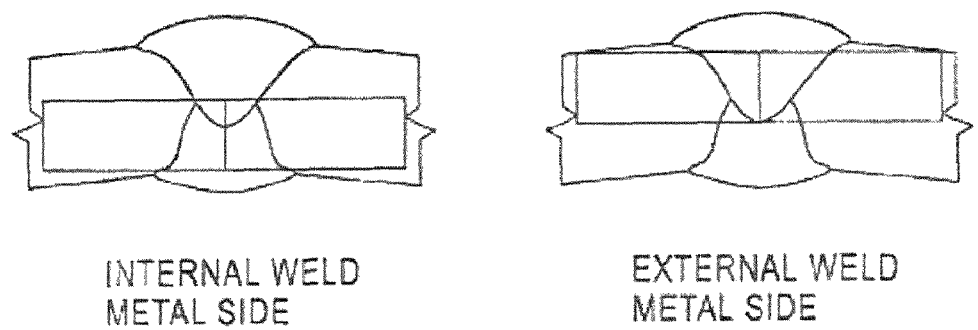
FIG. 2 is a cross-sectional view of the location at which a Charpy impact test specimen is taken.

No. 1, which was a comparative example and had a high Cr content of weld metal, exhibited low weld metal toughness. Weld metal toughness was examined by a Charpy impact test. FIG. 2 shows the location at which a Charpy impact test specimen was taken.

No. 2, which was a comparative example and had a high Ni content and a large negative CS value, had significant cold cracking. While many cracks were observed in an internal bead, a crack reaching the internal surface and a small crack having a size of approximately 1 mm in the bead were also observed on the external surface side. In No. 2, which had a negative CS value and a decreased Si content of weld metal, the Charpy absorbed energies Of internal and external weld metals were decreased. In the presence of transverse cracking in a weld bead, a tensile test and a Charpy test could not be performed. Before the mechanical tests, therefore, a post heat treatment at 200° C. for two hours was performed after welding to prevent transverse cracking.

In No. 3, a high C content of welding wire, a high C content of weld metal, and a negative CS value resulted in the occurrence of cracking in the weld metal, and high Si and Cr contents of the weld metal resulted in a low Charpy absorbed energy, particularly of external weld metal.

No. 4, which had the weld metal components within the scope of this disclosure but a negative CS value, had weld metal cold cracking. To prevent cold cracking, not only does the weld metal composition satisfy the component ranges described above, but also the CS value must be zero or more.

In No. 5, which had a positive CS value, weld metal cold cracking was prevented. However, the welding wire had a high Mo content, and the weld metal had an excessively high Mo content. Thus, toughness, particularly of external weld metal, was decreased.

In No. 6, which had an excessively high Mn content and a low Mo content of welding wire, the Mn content of weld metal was high, and the Mo content of the weld metal was low. This resulted in a negative CS value, caused transverse cracking of the weld metal, and decreased weld metal toughness.

No. 7, which had a high Cu content of welding wire and thereby a high Cu content of weld metal, had hot cracking of the weld metal. Owing to this hot cracking, the mechanical tests of the weld metal could not be performed.

In No. 8, which had a positive CS value, weld metal cracking was prevented. However, an excessively high V content resulted in low toughness, particularly of external weld metal.

In No. 15, which had a high Cr content of welding wire and thereby an increased Cr content of weld metal, weld metal toughness was decreased.

In No. 17, which had a low Si content of welding wire and thereby a low Si content of weld metal, weld metal toughness was decreased.

No. 21, which had a low C content of weld metal, had hot cracking of the weld metal:

In No. 22, which had a low Ni content of weld metal, weld metal toughness was decreased.

The invention claimed is:

1. A high-strength welded steel pipe including a weld metal having high cold-cracking resistance, wherein the welded, steel pipe is manufactured by double one layer submerged arc welding performed on an internal surface and an external surface of a base metal, both the base metal of the welded steel pipe and the weld metal have a tensile strength of 800 MPa or more, the weld metal contains C: 0.04% to 0.09% by mass, Si: 0.30% to 0.50% by mass, Mn: 1.4% to 2.0% by mask Cu: than 0.5% by mass, more than 0.9% by mass but not more than 4.2% by mass, Mo: 0.4% to 1.6% by mass, Cr: less than 0.3% by mass, V: less than 0.2% by mass, and the remainder of Fe and incidental impurities, and CS Values calculated from the weld metal components using the following equation (1) are equal to zero or more at both the internal surface and the external surface:

$$CS=5.1+1.4[Mo]-[Ni]-[Mn]-36.3[C] \qquad (1),$$

with the following definitions

[Mo]: Mo content of weld metal (% by mass)
[Ni]: Ni content of weld metal (% by mass)
[Mn]: Mn content of weld metal (% by mass) and
[C]: C content of weld metal (% by mass), wherein the base metal contains C: 0.03% to 0.12% by mass, Si: 0.01% to 0.5% by mass, Mn: 1.5% to 3.0% by mass, Al: 0.01% to 0.08% by mass, Nb: 0.01% to 0.08% by mass, Ti: 0.0005% to 0.024% by mass, N: 0.001% to 0.01% by mass, O: 0.004% by mass or less, S: 0.002% by mass or less, Ca: 0.0005% to 0.01% by mass, at least one selected from the group consisting of Cu: 0.01% to 1.3% by mass, Ni: 0.1% to 3.0% by mass, Mo: 0.01% to 1.0% by mass, Cr: 0.01% to 1.0% by mass, and V: 0.01% to 0.1% by mass, and the remainder of Fe and incidental impurities.

2. A method for manufacturing the high-strength welded steel pipe including a weld metal having high cold-cracking resistance according to claim 1, comprising performing double one layer submerged arc welding on an internal surface and an external surface of a base metal using a welding wire and a melt flux, the welding wire having an average composition of multiple electrodes of C: 0.01% to 0.14% by mass, Si: 0.25% to 0.7% by mass, Mn: 0.7% to 2.3% by mass, Cu: less than 1.0% by mass, Ni: 2.0% to 10.0% by mass, Mo: 0.8% to 3.8% by mass, Cr: less than 0.7% by mass, and V: less than 0.4% by mass, wherein CS values calculated from the weld metal components using equation (1) are equal to zero or more at both the internal surface and the external surface, wherein the base metal contains C: 0.03% to 0.12% by mass, Si: 0.01% to 0.5% by mass, Mn: 1.5% to 3.0% by mass, Al: 0.01% to 0.08% by mass, Nb: 0.01% to 0.08% by mass, Ti: 0.0005% to 0.024% by mass, N: 0.001% to 0.01% by mass, O: 0.004% by mass or less, S: 0.002% by mass or less, Ca: 0.0005% to 0.01% by mass, at least one selected from the group consisting of Cu: 0.01% to 1.3% by mass, Ni: 0.1% to 3.0% by mass, Mo: 0.01% to 1.0% by mass, Cr: 0.01% to 1.0% by mass, and V: 0.01% to 0.1% by mass, and the remainder of Fe and incidental impurities.

* * * * *